(12) United States Patent
Rehm

(10) Patent No.: US 8,077,155 B2
(45) Date of Patent: Dec. 13, 2011

(54) RELATIVE-POSITION, ABSOLUTE-ORIENTATION SKETCH PAD AND OPTICAL STYLUS FOR A PERSONAL COMPUTER

(76) Inventor: Peter H. Rehm, Orem, UT (US)

(*) Notice: Subject to any disclaimer, the term of this patent is extended or adjusted under 35 U.S.C. 154(b) by 1026 days.

(21) Appl. No.: 11/893,547

(22) Filed: Aug. 16, 2007

(65) Prior Publication Data

US 2007/0285405 A1    Dec. 13, 2007

Related U.S. Application Data

(63) Continuation-in-part of application No. 11/353,608, filed on Feb. 13, 2006, now abandoned.

(51) Int. Cl.
*G06F 3/041* (2006.01)

(52) U.S. Cl. .................... 345/173; 178/18.03
(58) Field of Classification Search ........... 345/173, 345/179; 178/18.03–18.1, 19.01, 19.05
See application file for complete search history.

(56) References Cited

U.S. PATENT DOCUMENTS

| | | | | |
|---|---|---|---|---|
| 4,995,641 A | * | 2/1991 | Landry et al. | 283/67 |
| 5,115,893 A | * | 5/1992 | Terkildsen | 190/11 |
| 6,337,698 B1 | * | 1/2002 | Keely et al. | 715/823 |
| 2004/0036681 A1 | * | 2/2004 | Kluttz et al. | 345/173 |
| 2005/0040070 A1 | * | 2/2005 | Adams | 206/562 |
| 2006/0227121 A1 | * | 10/2006 | Oliver | 345/179 |
| 2009/0128520 A1 | * | 5/2009 | Combe | 345/179 |

* cited by examiner

*Primary Examiner* — Quan-Zhen Wang
*Assistant Examiner* — Yuk Chow

(57) ABSTRACT

A notebook computer is upgraded by providing stylus-cooperating indicia near the keyboard and an optical stylus that can recognize the indicia. The indicia includes a sketch pad area that cooperates with the optical stylus to transmit movement data to the computer. The movement data is relative in position and absolute in orientation, providing .DELTA.X and .DELTA.Y in the sketch pad's coordinate plane rather than the stylus's. Other indicia represents tool buttons recognized by both humans and the stylus. A stylus and stickers kit is used to upgraded existing notebook computers. New ones can be manufactured with the stylus-cooperating indicia in place or the indicia may be provided on a substrate that may be attached to any notebook computer, as selected and positioned by the end user. The stickers or substrate is thin enough to permit the notebook computer to be closed as usual. In an alternative embodiment, the indicia is printed on a mouse pad or other surface to provide tablet and stylus functionality to other kinds of personal computers as well.

5 Claims, 8 Drawing Sheets

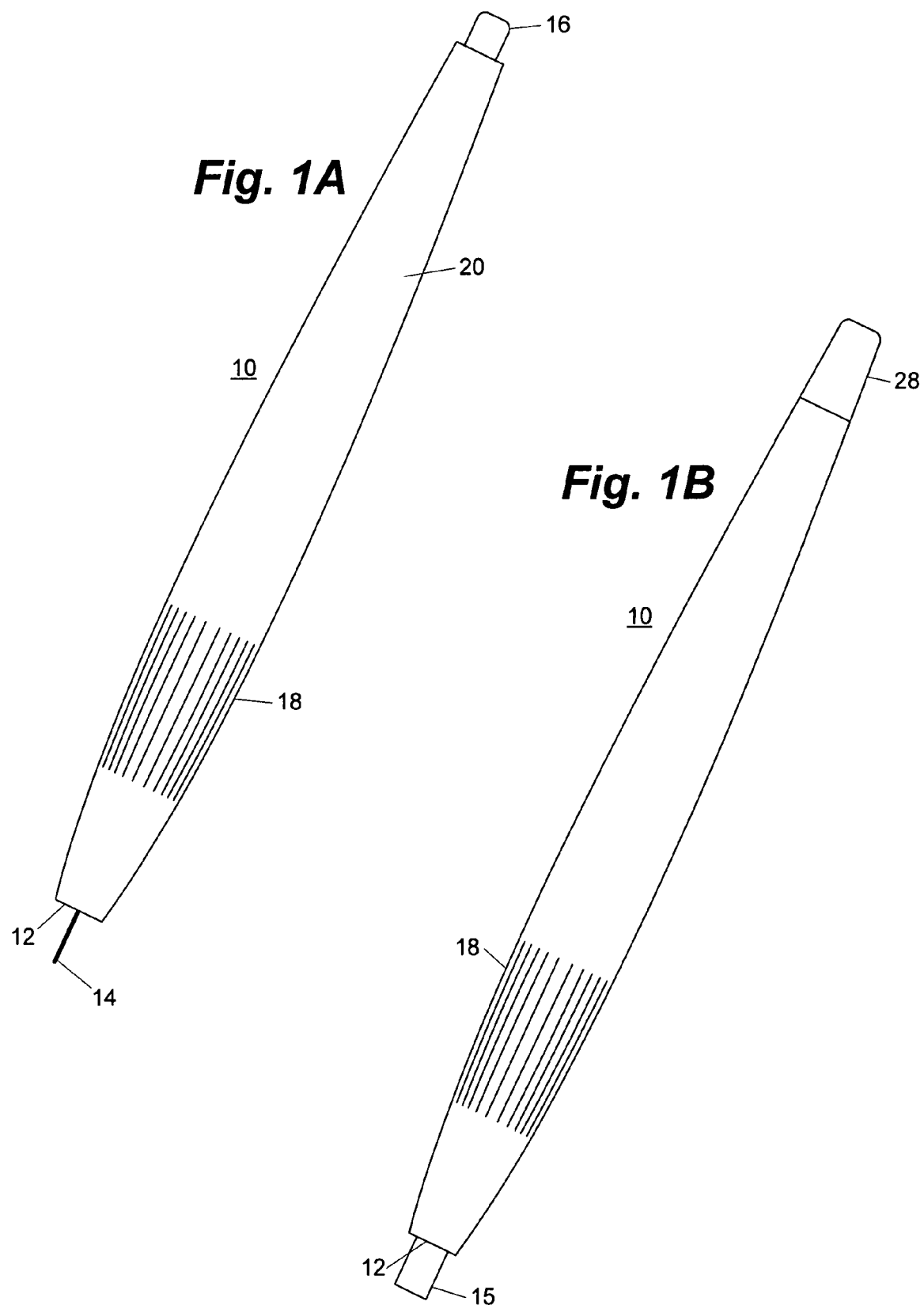

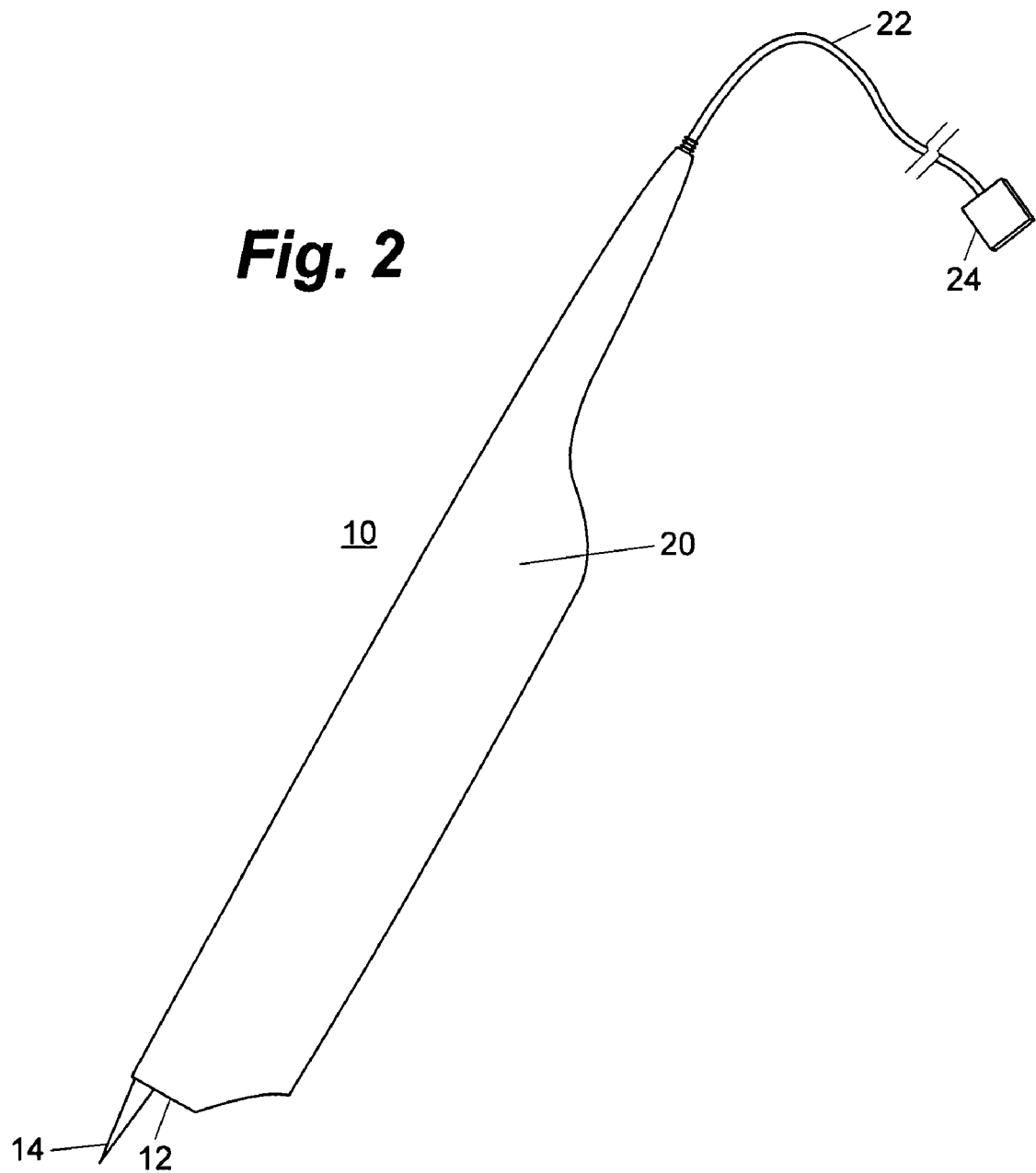

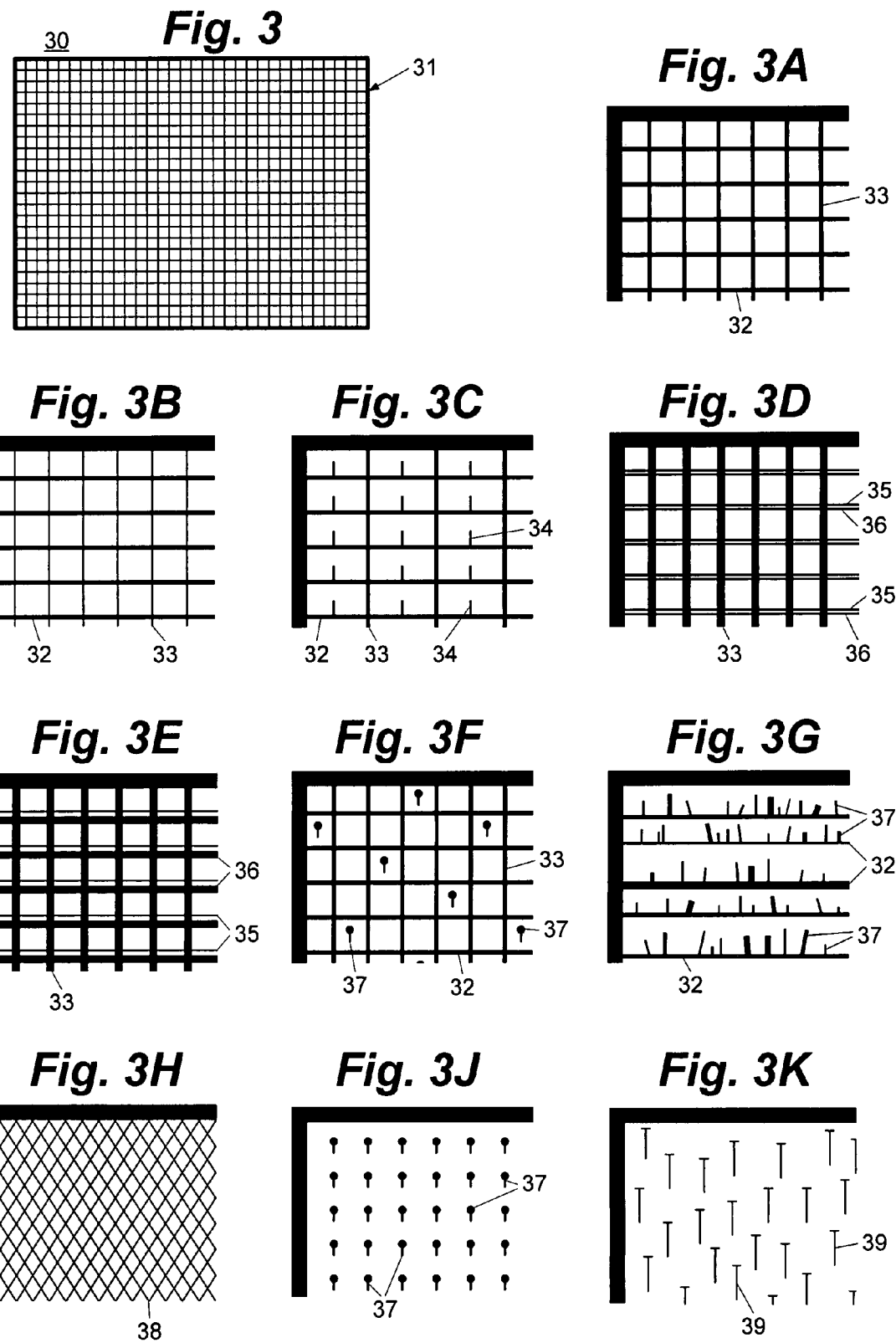

RELATIVE-POSITION, ABSOLUTE-ORIENTATION SKETCH PAD AND OPTICAL STYLUS FOR A PERSONAL COMPUTER

This application is a continuation-in-part of Ser. No. 11/353,608, filed Feb. 13, 2006, now abandoned.

BACKGROUND OF THE INVENTION

For many years, computer users have had the option of purchasing a digitizing tablet and stylus for their computers. A tablet and stylus allows the user to move the computer's cursor with a pen-shaped device called a stylus. When drawing sketches or creating other types of artwork on screen, a stylus can be used more naturally than a mouse or trackball or other type of input device.

Most styluses are sensitive to the "pressure" (i.e., force) with which the user applies the stylus to the tablet, and this force data is used by application software to determine characteristics such as line or brush width, darkness, or other quality that is applied to a digital canvas.

Many digitizing tablets use electromagnetic fields to determine the location of the stylus. The tablet is thus an active device that that has rows and columns of wires, or loops of wires, for generating the fields. The stylus includes electronics that interact with these fields.

Such digitizing tablets are provided as a separate devices for use with desktop computers. They are too large and cumbersome for portable use with a notebook computer. Even with a desktop computer, they can consume valuable space.

FingerSystems Inc. produces a product they call the i-pen, which (at least in some of its forms) is essentially an optical mouse shaped like a pen. It can be used with a special pad or on almost any surface. Its operation is relative-position and relative-orientation. Relative position means that there is no absolute coordinate system that it uses. Relative orientation means that movements up, down, left and right are interpreted according to the orientation of the device itself. This can be problematic, causing a user's writings to creep unexpectedly up or down because of how they hold it. It also skews sketches.

ANTO COMPONENTS (anoto.com) provides pen-and-paper based solutions for portable sketching. For example, the Logitech Digital Pen can be used to draw handwriting and sketches in real ink on "smart paper." It is not even necessary to have a computer nearby. The smart paper has absolute position codes encoded all over its surface. These codes are in indicia that is generally invisible to the human eye. However, the Pen "sees" the absolute position codes on the smart paper and stores the handwriting and sketching gestures in the pen for later download to a computer.

OBJECTS AND SUMMARY

It is an object of this invention to provide a way to add easily portable tablet and stylus functionality to an existing notebook computer, as well as supporting functionality for drawing sketches.

Another object is to provide a way that notebook computers can be manufactured with the sketch pad and tools already built-in, with virtually no redesign of the notebook computer itself.

Another objective is to provide a way for desktop computer users to enjoy a tablet and stylus without the need to find a place to store a large and cumbersome tablet.

These objectives and others unmentioned can be attained as follows.

A personal computer can be upgraded with a sketch pad and stylus by providing an optical stylus and placing stylus-cooperating indicia on an existing surface on or near the computer. The stylus-cooperating indicia includes a sketch pad area and optionally an assortment of tool buttons. The stylus-cooperating indicia can be applied via an adhesive sticker, printed directly on the surface of the computer, or printed on another surface. The invention is especially advantageous for notebook computers because the stickers or indicia take up virtually no space, allowing the notebooks to be closed as normal, and yet add all the functionality of a stylus and tablet.

The sketch pad is covered with indicia that can be detected by an optical stylus, permitting the computer to always track the stylus's movements when it is near the sketch pad. The optical stylus transmits the X and Y movement that it "sees" on the sketch pad to the computer. The stylus also detects contact with the stickers, and optionally force ("pencil pressure") as well. These transmissions may be wired or wireless. Alternatively, the stylus may transmit raw video to the computer where a software driver derives the motion data.

Because of special characteristics of the indicia on the sketch pad, the X and Y motion data is given relative to the orientation of the sketch pad. It is insensitive to the orientation of the optical stylus. This is implemented by providing indicia that can distinguish horizontal from vertical. "Up" and "down" (as well as "left" and "right") can be disambiguated either by inference from other factors such as vanishing point or they can be directly indicated in the indicia.

Various additional indicia-bearing stickers present an assortment of tools such as pens, brushes, erasers, colors, line weights, shapes and smart shapes. These tools can be selected by touching them with the stylus. These tools can be accessed faster and more conveniently by placing them outside the sketch pad than by providing them as soft tools somewhere on the computer display.

BRIEF DESCRIPTION OF THE DRAWINGS

FIGS. 1A-1B are side views of a two different kinds of wireless styluses.

FIG. 2 is a side view of a wired stylus according to the current invention.

FIG. 3 is a top view of a sketch pad according to the invention.

FIGS. 3A-3H and 3J-3K are close up views of just the upper-left corner of a sketch pad, each showing the details of a different embodiment of the invention.

DESCRIPTION OF THE PREFERRED EMBODIMENT

Figure 4A:
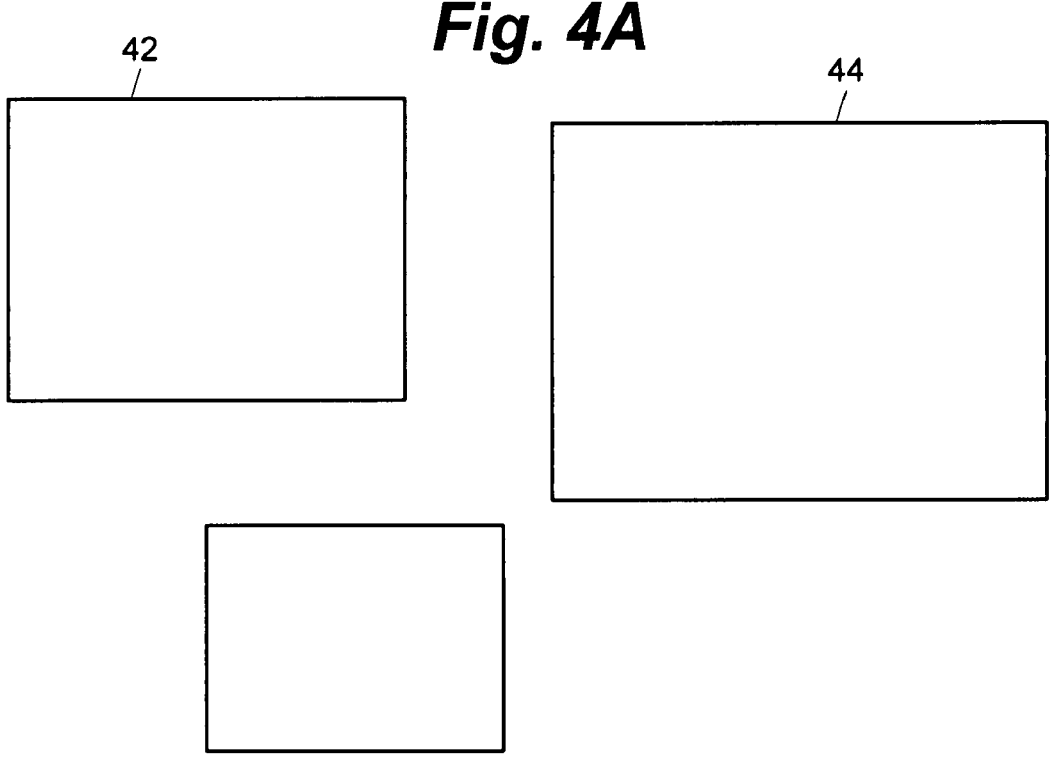
FIGS. 4A and 4B are a top and bottom view, respectively, of three sketch pad stickers of varying size.

FIG. 1A show a special stylus 10 made according to the teachings of the current invention. It could also be called a pen, but since it does not normally carry real ink the term stylus is more accurate.

The stylus 10 includes an optical sensor 12, such as a miniature area scan camera. This optical sensor 12 may be identical or similar to those found in the prior art. This optical sensor 12 can see a specially prepared surface so that by comparison of one image or frame to the next in a video stream a computing device can determine the motion that has taken place between frames. The specially prepared surface includes various tool pads and a sketch pad that is permanent and reusable.

Preferably, the stylus 10 has a digital writing tip 14. The digital writing tip 14 is just a pressure sensitive tip for sensing when the stylus 10 is in contact with the one of the pads. Real ink is not one of the features of the invention. Optionally, the stylus 10 also has a digital eraser tip 16 opposite the digital writing tip 14. The digital eraser tip 16 also has an optical sensor and a pressure sensitive tip.

The digital writing tip 14 may merely detect contact but preferably it also provides a measure of the force of contact. Although highly preferred, the ability to detect contact and measure the force are not absolutely necessary to the invention because contact can also be inferred optically.

Another optional feature of the invention is that it has a pressure sensitive ring 18 approximately where a user's fingers would hold the stylus when writing. This pressure sensitive ring is somewhat like a mouse button on a prior art stylus (for use with a tablet) but it is symmetrical around the stylus. That way, a user can activate it simply by squeezing without having to rotate the stylus to find a button.

The stylus 10 contains inside 20 a battery and wireless transmitter so that it can transmit movement or tool information and pressure sensitive tip information to a personal computer. The preferred method of transmission is Bluetooth or any other kind of wireless short range communication. The receiver may be built into the computer or may be plugged into one of the computer's input ports, such as PCMCIA, USB, parallel or serial port, etc.

Alternatively, the stylus 10 and personal computer may use any other form of wired or wireless communication, including electromagnetic or optical. For example, since the stylus will usually be near the base of a notebook computer, it can transmit infrared signals to an infrared detector located just above the notebook computer's display screen. The infrared light should be emitted from several places and in all directions so that the users hand does not block all the IR light during normal use, including when erasing.

FIG. 1B shows an alternative stylus 10 with a cylindrical digital writing tip 15. It permits the optical sensor 12 to see though the void in the cylinder. As shown, it is a separate piece from the stylus 10 body, but it could also just be an extension of the stylus 10 body. Preferably, cylindrical digital writing tip 15 is clear to permit more light to get to the subject matter. The optical sensor 12 may have a visible or infrared light source nearby to shine light down the length of the cylinder.

The cylindrical digital writing tip 15 does not provide a sharp tip as users expect in writing instruments. However, the users eyes are supposed to be on the computer display during use, because that is where the position of the stylus 10 is revealed in the form of a cursor. Thus, the user does not need a sharp tip. Internally, the invention operates by making the centerline down the cylinder the "hot spot" for purposes of determining where the stylus is pointing.

Both types of digital writing tips (14,15) maintain a minimum distance between the optical sensor 12 and the subject matter in contact or near the digital writing tips (14,15).

FIG. 1B also shows a diffuser 28 that spreads out the infrared light from and internal infrared light source. This diffuser 28 makes sure the infrared light is transmitted to an infrared receiver on the computer regardless of the orientation (rotation) of the stylus.

FIG. 2 shows an alternative stylus with a cable 22 leading to a USB connector 24 instead of a dedicated digital eraser tip 16. (The full length of the cable 22 is not shown.) This type of stylus 10 can still erase after picking up an eraser tool as is commonly done in drawing and painting software.

The alternative stylus of FIG. 2 also is not symmetrical about it longitudinal axis. It has an optical sensor on only one side of its digital writing tip 14. It is intended to be held a certain way and not rotated.

The connection methods shown (radio, infrared, cable) and tip variations shown (regular, cylindrical, asymmetric) are independent of each other. For example, there can be a stylus with a cylindrical digital writing tip and a cable.

FIG. 3 shows a sketch pad 30. It is marked with stylus-cooperating indicia 31 that cooperates with the stylus 10 to make it possible (even easy) to automatically detect motion in an relative-position, absolute-orientation manner. For the purposes of the current invention, the markings do not need to be light as in smart paper because no ink needs to be visible on them. The markings may be invisible, visible or even very obvious to the human eye, it does not matter. Additionally, they may be monochromatic or color, with various advantages and disadvantages. Generally, color adds the cost of using a color camera in the stylus, but it also provides simplicity in detecting features of the stylus-cooperating indicia 31. These trade-offs affect the manufacturer. Which is better depends on market conditions.

FIGS. 3A to 3K show close ups of various example embodiments of stylus-cooperating indicia. Only the upper-left corner of the sketch pad 30 is shown in each lettered figure. (Note: There is no figure for 3I because the letter I looks too much like the digit 1, so the label was skipped.)

In all embodiments, the motion reported is not based on how the indicia moves in the pixels of the camera or other optical sensor 12. Instead, it is based on how the indicia moves in relation to the coordinate system established by the indicia itself.

FIG. 3A shows an ordinary grid of horizontal lines 32 and vertical lines 33. This is sufficient to practice the invention in the minimum case. The lines establish a coordinate system which may be interpreted four ways (each 90 degrees off of the next). However, each user generally holds a pen or stylus consistently, especially when using the stylus of FIG. 2, which is not subject to rotation about its longitudinal axis. Thus, with a simple training step, the invention can be trained on which lines are horizontal and which way is up. All the computer has to do is ask the user to hold the stylus normally and make a movement as directed. (e.g., drag it from upper left corner to lower right.) While there will be minor variations in the orientation of the stylus to the sketch pad, and minor variations in rotation about the stylus's own longitudinal axis, these variations will not be significant enough to cause ninety degrees worth of confusion.

FIG. 3B shows a grid in which the horizontal lines 32 are heavy and the vertical lines 33 and light. Thus, the stylus-cooperating indicia can be used to distinguish horizontal motion from vertical motion. This narrows down the interpretations of the grid to only two interpretations. The same result can be obtained by using two different colors and a color camera.

FIG. 3C shows a grid in which the stylus-cooperating indicia includes indicia for distinguishing horizontal motion from vertical motion (via a rectangular box rather than a square box) and also for establishing a fixed angle (the angle markers 34 extending from the top side of the horizontal lines 32). The angle markers 34 can be the same color as the lines or for even easier processing they can be a different color.

FIG. 3D shows a grid that has single vertical lines 33 and pairs of horizontal lines, each pair having an upper horizontal line 35 and a lower horizontal line 37. This arrangement distinguishes horizontal and vertical lines. If the upper horizontal lines 35 and lower horizontal lines 37 are identical then the grid does not distinguish up from down, but it can still be used as described above. If the upper horizontal lines 35 and lower horizontal lines 37 are distinguishable in any way (such as color) then the grid also establishes a fixed angle.

FIG. 3E shows a similar grid in which the upper horizontal lines 35 are substantially thinner than the lower horizontal lines 36. This is another way of establishing a fixed angle that can be done monochromatic.

FIG. 3F shows a grid with square boxes and horizontal lines 32 and vertical lines 33 that are identical. They can be distinguished, and a fixed angle is established, by the presence of some angle markers 37. These angle markers 37 are dots with a line extending out in one direction in a consistent manner. They do not touch any of the lines. These features make it easy to find the angle markers programmatically. It could be made even easier than that by making the angle markers 37 their own distinct color. Every box could have an angle marker or just some randomly or in a pattern. In another variation that is not shown, the angle markers may be as simple as dots that establish a fixed angle by their consistent off-center location within each square rather than by having a line extending out from them.

FIG. 3G shows that the stylus-cooperating indicia need not be a regular grid. A number of parallel horizontal lines 32 and a few angle markers 37 are sufficient. The parallel horizontal lines 32 distinguish horizontal from vertical and the angle markers disambiguate up from down. This is true even though the parallel horizontal lines 32 and angle markers 37 are not of uniform weight or spacing and the angle markers 37 are not of uniform length or, ironically, angle. The reason they still function as angle markers is that they determine which side of the parallel horizontal lines 32 is up. The random elements actually provide an advantage in that it makes determining movement more certain. For example, with a regular pattern such as FIGS. 3A-3E, in theory at least, a sudden quick movement that extends almost an entire repetition length of the pattern could be mistaken for a smaller motion in the opposite direction. An irregular pattern does not repeat and so is immune to this problem. This would come up in practice only if the video frame rate is not very high, which means that using an irregular pattern is a way of dealing with a low video frame rate. (The embodiment of FIG. 3G could just as easily been demonstrated with parallel vertical lines instead.)

FIG. 3H shows an embodiment of the invention in which the stylus-cooperating indicia are hatched lines 38 that are parallel but neither horizontal nor vertical and not even perpendicular where they intersect. In this particular case, the points of intersection can be used to determine horizontal and vertical lines, and the shapes of the diamond can be used to distinguish horizontal from vertical.

FIG. 3J shows an embodiment having no long lines at all. Instead, it has a regular array of angle markers 37 that map out horizontal and vertical by their rows and columns.

FIG. 3K shows an embodiment in which extended angle markers 39 are arranged in irregularly. They are large enough to establish a fixed angle on their own, which also distinguishes between horizontal and vertical and up and down.

An actual image comes from a stylus that is held in someone's hand at an angle that is usually not normal (perpendicular) to the paper. This means the image will have closer and further parts, and parallel lines will not appear perfectly parallel in the image. The most useful part of the image, the part to base the measurements of motion on, is the part that is closest to a predetermined fixed point such as the digital writing tip 14 of FIG. 1A or the "hot spot" of the stylus of FIG. 1B. The amount of movement may be determined either by measuring image shift in pixels or by measuring it in terms of lines of indicia (such as the lines 32 and 33 when equally spaced). In either case, fractional amounts increase accuracy. If measuring in pixels, the measurements may be taken along the lengths of the horizontal lines 32 and vertical lines 33 to retain the absolute orientation aspect of the invention. Alternatively, measurements in pixels may be taken in the coordinate frame of the camera and then mathematically converted to the orientation of the lines in the image, which orientation is separately measured.

According to the current invention, various types of sketch pads 30 can be provided. One preferred way is to provide them as adhesive stickers. These stickers would have adhesive on their bottom or back sides, which are protected by a peelable or otherwise removable cover. After the cover is removed, the adhesive sticker sketch pad is mounted on the base of a notebook computer, either to the right or left of a touch pad, in the flat area in front of the keyboard. The mounting can be permanent or temporary as desired depending on the type of adhesive used. The adhesive may be self-sticking or it may require water to activate it depending on the type of adhesive used. Other means of attachment may also be used, including cohesion, static electric, magnetic, friction, any type of fastener such as screws, bolts, clips, etc. The sketch pad may be provided as a transfer decal that transfers a pigment via heat or pressure. The sketch pad may even be chemically etched out of the flat surface. Alternatively, an original equipment manufacturer (OEM) may want to print a sketch pad directly on notebook computer or other computing device. The sketch pad may also be applied to a hard piece of material that may be placed on a computer or desk or keyboard drawer next to a mouse pad.

FIG. 4A shows the preferred way of providing the sketch pad 30, which is as a selection of adhesive-backed sketch pads (42, 44, 46) of various sizes. Thus, a person with a notebook computer can pick the best size pad for the amount of space available. The user may also want to apply a sketch pad near the mouse pad of a desktop computer.

Figure 4B:
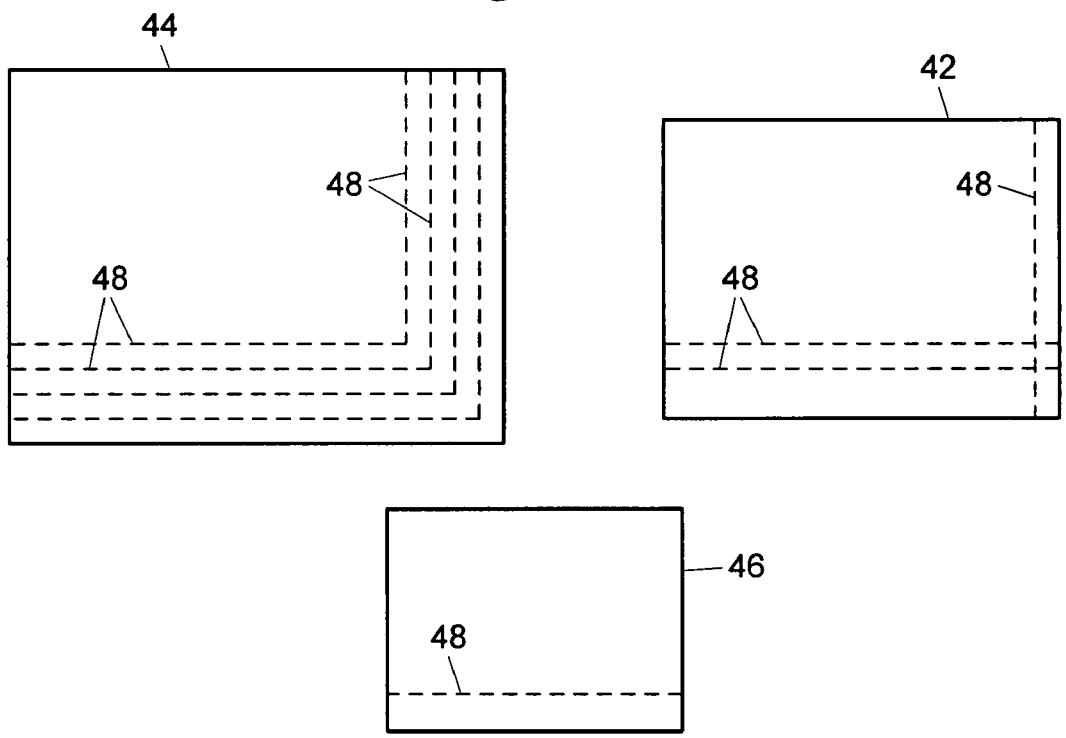

FIG. 4B shows the bottom or back sides of the adhesive-backed sketch pads (42, 44, 46), showing optional guide lines 48 for trimming the sketch pad with scissors or a paper cutter. There are twp reasons why the sketch pads may need to be trimmed. The first is to make one fit the flat area in front of the keyboard of the notebook computer, as shown by the guide lines 48 of largest sketch pad 44. The second reason is the make the aspect ratio of the sketch pad match the aspect ration of the computer's display, as shown by the guide lines 48 of the two smaller sketch pads (42, 46).

The invention also provides for the selection of drawing tools using the stylus. This could be done by providing soft buttons displayed on the screen and selectable by stylus or other pointing device. However, the preferred way of providing drawing tools is to provide printed buttons that are recognizable by the stylus's optical sensor 12. These buttons are also printed on adhesive stickers. They could be put on the same sticker as the sketch pad, but it is preferred that they be provided as separate stickers grouped by function.

Providing drawing tools on separate stickers grouped by function has several advantages. It allows the user to choose the tools that will be important to them and only apply those to their notebook computer. It also allows the user to arrange the stickers on the notebook in a manner that makes sense to them and that fits in the space available.

Figure 5:
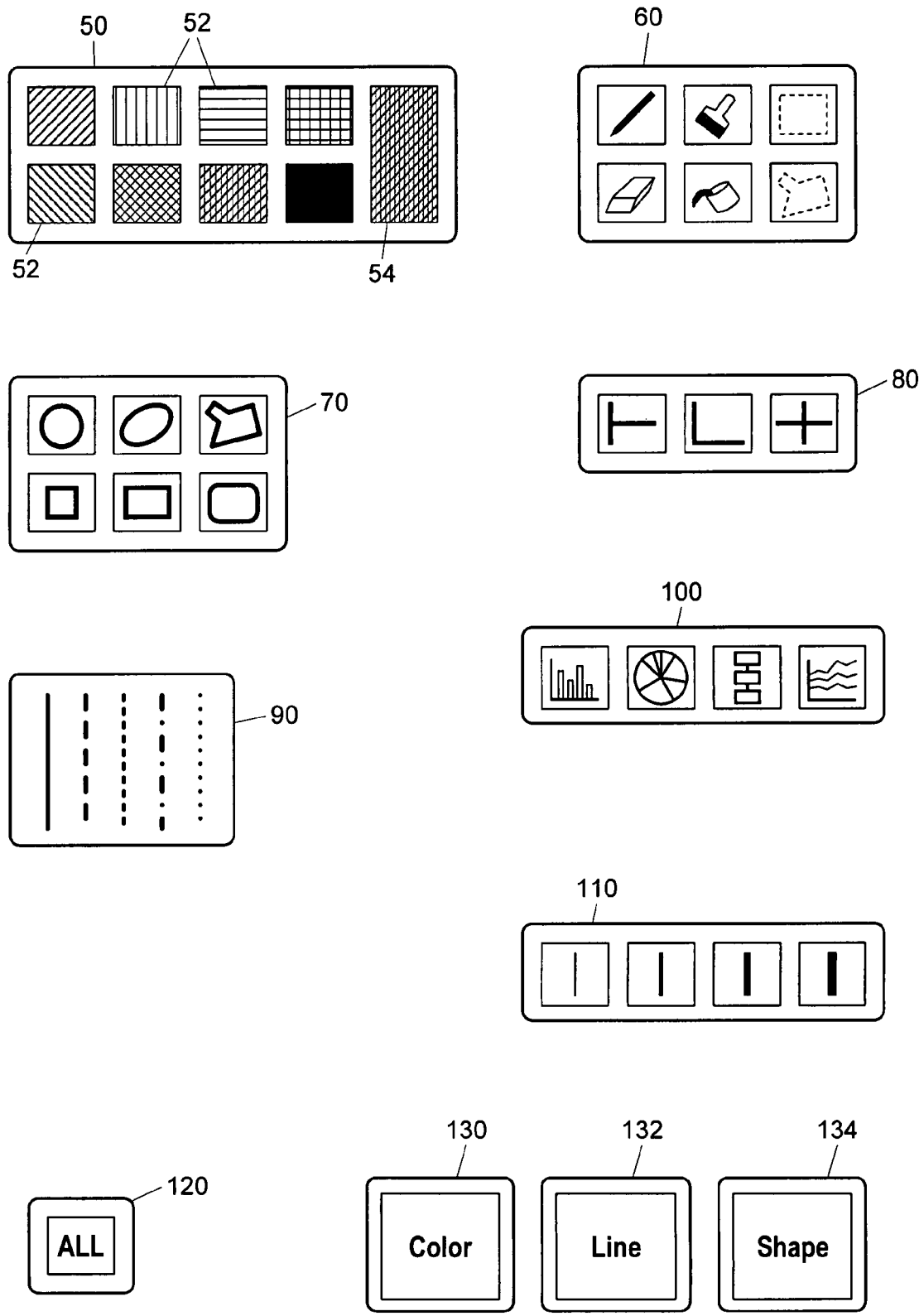
FIG. 5 is a top view of a variety of tool stickers.

FIG. 5 shows the preferred way of providing various tools stickers. Each tools sticker contains one or more buttons that are recognizable by the stylus 10 as well as a human user. These buttons are ink printed on the sticker. The buttons have no functional parts other than the color or icon that reminds the user of their meaning and some manner of recognition for the stylus 10.

When the stylus is touched on one of the tools, its cursor on the computer display is changed (when possible) to represent the new tool. If the cursor is limited to black and white then color can not be changed. The display should also have a static display area that contains the current tool and color information, so that the user can see which tool and color are active regardless of where the cursor is.

The manner of recognition of these tools or buttons may be identical or keyed. Identical means that the stylus 10 or computer recognize the same colors and icon that the human sees. Keyed means that there are other symbols embedded among the colors or icons and that the stylus 10 recognizes these other symbols, which are keyed to the button's meaning. The stylus can report the which button was pressed or the keying data embedded in the button that was pressed. The keying can be done with infrared ink and light, with visible ink and light that does not interfere with the colors and icons.

The choice of tools and stickers to provide, their sizes and arrangements and choice of icons are all a matters of design. Indeed, several designs can be provided so that the user makes the final choice.

One such design is shown in detail in FIG. 5. The first sticker 50 contains eight color buttons 52 presenting eight different colors. When the user wants to draw with a different color of digital ink, he just touches the stylus 10 to one of the color buttons 52 to "pick up" the new color.

This first sticker 50 also includes a color picker button 54. It calls up a color picker soft tool to the display, where the user can pick a color that is not available among the eight color buttons 52.

The second sticker 60 contains some common drawing tools, including (from left to right, top row to bottom row): a pen, a paintbrush, a rectangular selection tool, an eraser, an area flood fill tool, and an irregular shape selection tool.

The third sticker 70 contains some common shape buttons including a circle, an ellipse, an irregular shape, a square, a rectangle, and a rounded rectangle.

The fourth sticker 80 contains buttons that allow placement of various X-Y coordinate grid shapes on a drawing, such as would be useful in a math class. These include a grid with no negative X axis, one with only the positive X and Y axes, and one with both positive and negative X and Y axes.

The fifth sticker 90 shows different line types that would be used when the pen or common shape tools are active. These "buttons" don't have defined boundaries, the lines plus a little surrounding space defining an area that needs to be touched with the stylus 10 to select the line. The lines include a solid line, a heavy dashed line and other lines all the way to a finely dotted line. This fifth sticker 90 also shows that the icons do not really have to be in boxes.

The sixth sticker 100 contains charts and graphs of various kinds, such as would be useful to a business major. It shows a histogram, a pie chart, a flowchart or organizational diagram, and comparison graph. When one of these is selected, a smart shape is inserted into the user's drawing. The user is then free to customize the number of bars or sections, their sizes and colors, etc.

The seventh sticker 110 shows different line weights from thin to very heavy.

The eighth sticker 120 has only one button which has a special function. It calls up all the available buttons to the display as soft buttons. Thus, the user may only apply stickers for the most important buttons to the notebook computer and yet still have all the functionality of all the buttons available. Preferably, the functionality of the eighth sticker's button is duplicated in software with a keystroke combination and menu item as well.

The ninth sticker 130, tenth sticker 132 and eleventh sticker 134 are a bit larger than the others. They are designed to be recognized while the stylus is still hovering and to immediately (while hovering) open a window of presenting various related soft tools on the display. The user then selects the tool on the display. Preferably, the extent of movement available to the mouse cursor matches the extent of movement of the stylus over the button. This technique allows many more tools to be accessible while using less space on the exterior of the computer.

Figure 6:
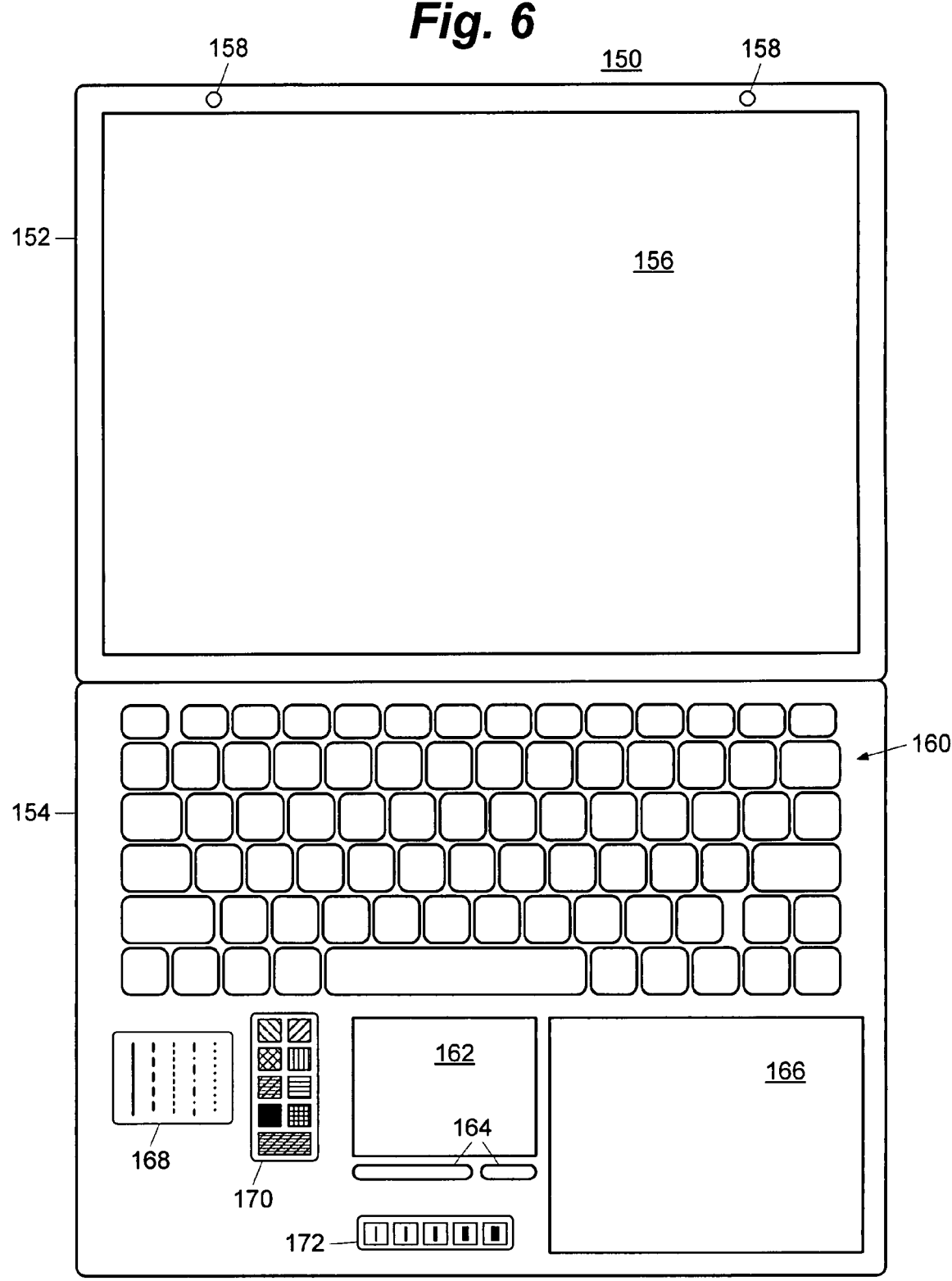
FIG. 6 is a top view of a notebook computer as modified by the current invention.

FIG. 6 shows a notebook computer 150 modified according to the current invention. It has a display member 152 and a base member 154. The display member has a display 156. It may optionally have one or more infrared receiving devices 158 as well, if infrared transmission is being used to communicate signals from the stylus 10 to the notebook computer. As most notebook computers come with some form of wireless communication capability, the use of such built-in communication is preferred. The base member 154 has a keyboard 160, touch pad 162 and mouse buttons 164.

According to the invention, the user applied stickers to the base member 154 of the notebook computer 150. These include a sketch pad sticker 166 and the user's choice of various tools stickers (168, 170, 172). An appropriately sized sketch pad sticker 166 may be applied to the right or left based on the user's preferred writing and drawing hand.

The advantage of providing the sketch pad 166 and tools (168, 170, 172) as adhesive stickers is that the end user may select and place these stickers in a custom arrangement as space and individual needs dictate. Another advantage is that they may be added to existing computers of all types. It is of particular advantage to notebook computers because stickers take up so little space that the notebook can still be closed normally with the sketch pad 166 inside. That can not be done with a traditional graphic tablet and stylus.

Figure 7:
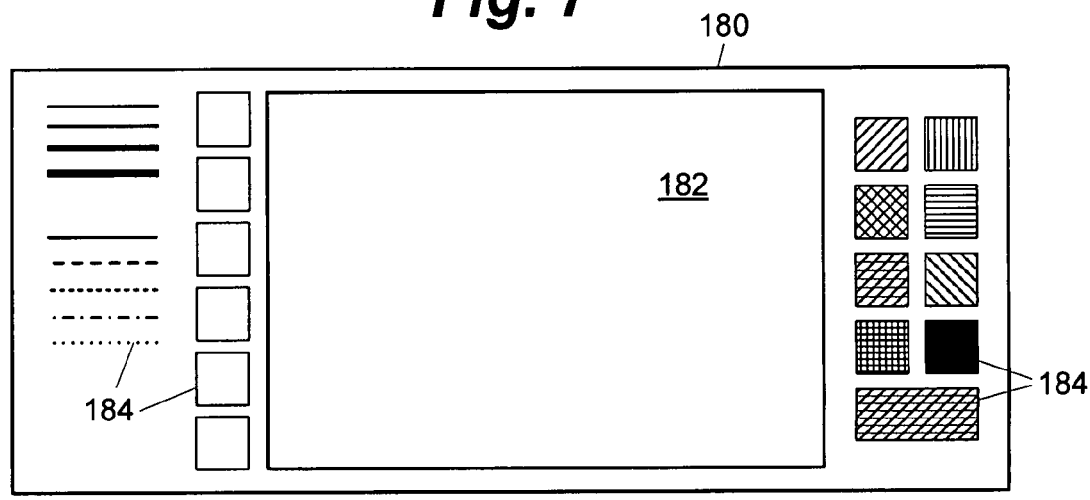
FIG. 7 is a top view of a base member having a sketch pad and some tools.

FIG. 7 shows another way of providing the sketch pad and tools of the invention. Here, the sketch pad 182 and the most popular tools 184 are printed on the surface of a base member 180 that is somewhat similar to a mouse pad. This base member 180 is intended to be placed on a desk or keyboard drawer. It may be flexible or rigid. Preferably, it has a non-slip backing material or non-slip feet. This way of providing the invention has the advantage of taking up little space on a desk or keyboard drawer, such as near an existing mouse pad.

Figure 8:
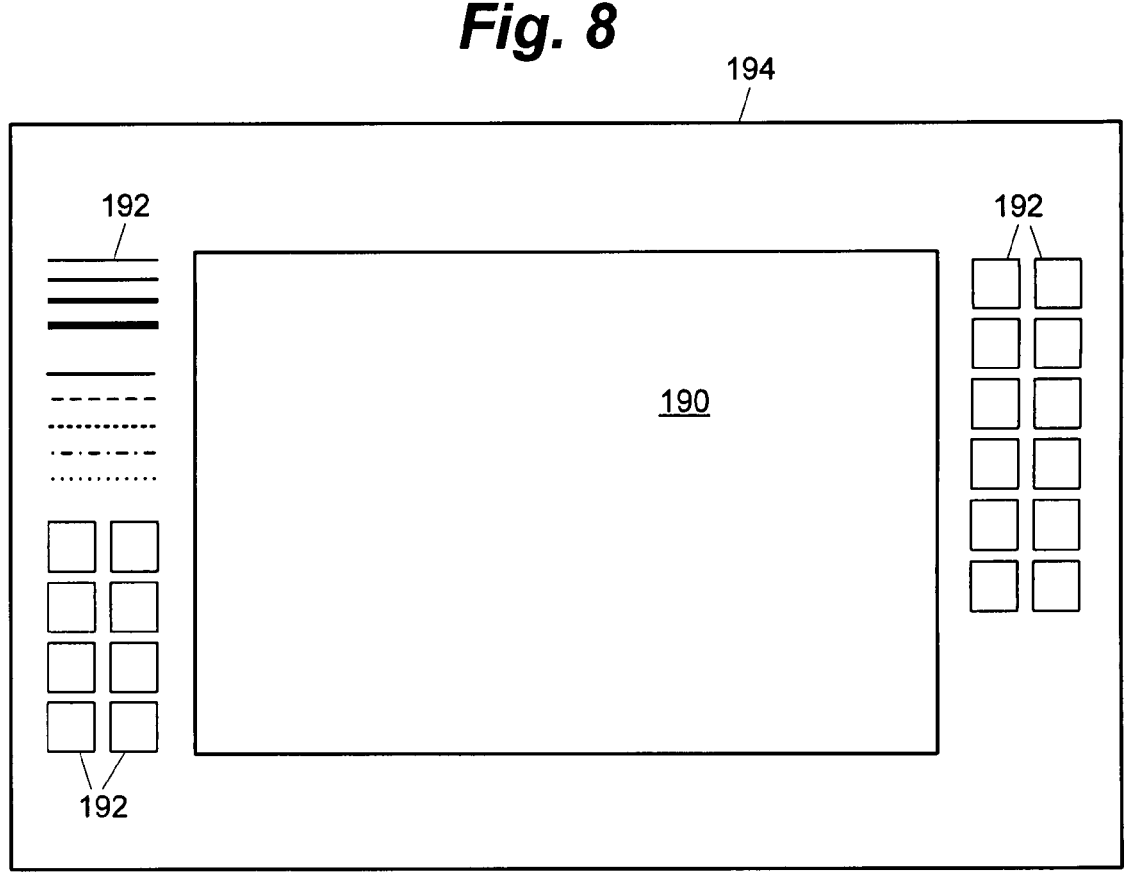
FIG. 8 is a top view of a mouse pad having a sketch pad and some tools.

FIG. 8 shows a variation of FIG. 7 in which the sketch pad 190 and tools 192 are printed on a mouse pad 194 so that they share the same space. This has the advantage of requiring no more desk or keyboard drawer space than an existing mouse pad requires. It also has the advantage of being relatively easy to manufacture because many companies already produce mouse pads of that form factor with various pictures on their surfaces.

Figure 9A:
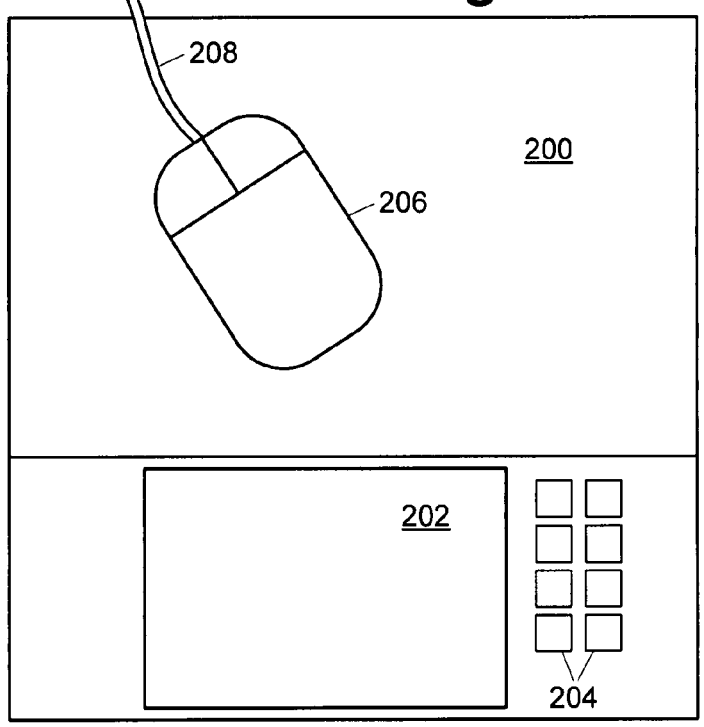
FIGS. 9A and 9B are top views of two embodiments of a computer mouse on an alternative mouse pad that has dedicated mouse pad area as well as a sketch pad and tools.

FIG. 9A shows a variation of FIG. 7 with an integrated dedicated mouse pad area 200. Any arrangement is usable, but it is preferred that the integrated dedicated mouse pad area 200 be behind the sketch pad 202 and tools 204 so that the mouse 206 or mouse cord 208 (if any) do not tend to be in the way of the sketch pad, tools or the users hand or wrist. This integrated dedicated mouse pad variation is for use on a desktop or keyboard drawer where there is room for a deeper mouse pad.

Figure 9B:
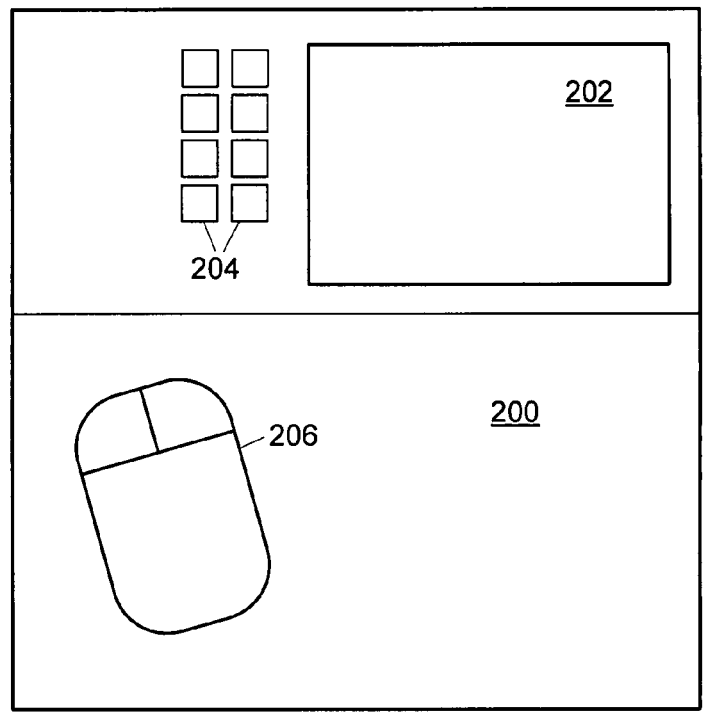

Nevertheless, some users may prefer the dedicated mouse pad area in the front and the new sketch pad and tools in the back. Accordingly, FIG. 9B shows a variation of FIG. 9A in which the mouse pad area 200 is in front with a mouse 206 that is cordless.

Yet another way of providing the invention is for manufacturers or value added resellers of computers, computer peripherals, computer furniture or keyboard trays to mount the sketch pad 166 and tools (168, 170, 172) on surfaces of the various products they produce. The sketch pad and tools may be printed directly on these surfaces, but it will likely be preferable to print them on plates or sheets and permanently mount these plates or sheets on the goods.

Internal Operation

The sketch pads are made of stylus-cooperating indicia affixed to any suitable surface. The stylus-cooperating indicia are markings that can be tracked so that motion can be detected and that establish one or more fixed angles. Those functions can be performed by separate sets of markings (e.g., FIG. 3F) or by a single set of markings (e.g., FIGS. 3J and 3K). It is best if the markings establish just one fixed angle, meaning that it unambiguously reveals the orientation of the sketch pad to the stylus. However, it is still possible and practical to use markings that merely distinguish horizontal motion from vertical motion but can not distinguish up from down (e.g., FIGS. 3B and 3D when implemented monochromatically). It is even possible to use markings that have four interpretations (e.g., FIG. 1A when implemented monochromatically). And if one really tried, higher numbers of interpretations would be possible and usable with honeycomb and other arrangements. These still can report motion consistently in spite of minor variations in the orientation of the stylus to the sketch pad and minor variations in rotation about the stylus's own longitudinal axis. Higher numbers of interpretation increase the likihood of the stylus getting it wrong and increase the burden of using other clues to determine the correct interpretation. The easiest clue is to ask the user to point the stylus at one or two fixed spots on the sketch pad. Even pointing the stylus at one known corner will reveal which way it is oriented because the stylus-cooperating indicia stops there. The field of view of the optical stylus should be large enough to always encompass enough markings to make the necessary determinations.

Preferably, the stylus-cooperating indicia should be unambiguous even when rotated. This is more important for optical styluses that may be freely rotated about their longitudinal axis than for those that have to be held a certain way. A system of markings that are unambiguous even when rotated is an advantage for simplicity and reliability, but it is not a requirement.

It should be noted that since the current invention does not use a pen that delivers ink, there is no requirement for the current invention that the markings be light enough to allow user-applied indicia to be seen. In other words, the sketch pad may appear to a human observer to have an overall dark or light shade or anything in-between. This provides additional flexibility to the current invention.

The sketch pad portion may be all or part of the surface. Usually, it is a rectangle that has the same aspect ratio of the computer screen with which it is intended to be used.

The stylus includes a camera that is responsible for optically detecting (seeing) the encodings of two-dimensional location. The camera should be fixed focus and have adequate depth of field to clearly see the encodings under normal use. Normal use includes the various angles that users will hold the stylus to the sketch pad. Normal use also includes a hover distance over the surface.

By detecting and transmitting data even when the stylus is hovering over the sketch pad, it is possible for the stylus to take control of the cursor on the computer's display before the user touches the stylus to the sketch pad. This gives the user valuable feedback and allows the user to move the stylus to the exact point desired before starting to draw.

To conserve battery life, it is preferable that the stylus transmit data only when it is hovering over the sketch pad within a predetermined hover distance, or when the stylus is in contact with the sketch pad or one of the tools. It is not necessary to transmit data when the stylus is out of range of the sketch pad and any tool buttons.

Note that some tool buttons may call up soft tools on the display screen. In this case it is useful for these soft tools to appear while the stylus is still hovering over the tool button sticker (or other form of attachment).

The stylus transmits when a sufficiently focused image of the sketch pad is in view, or if a tool button is in view. By not transmitting at other times the stylus can be moved away, put down on a desk, etc., without causing unwanted inputs.

The stylus preferably powers itself down when it is not in use. This can be accomplished in any one or more of several ways: By providing a power switch; by providing a timer that powers it down after a predetermined time of non-use, with use determined by pressing the stylus against a surface; by providing an orientation detection device so that the stylus powers down immediately whenever it is laying on its side; or by providing it with a magnetic switch so that it powers down immediately upon being placed in a magnetic stylus holder that bears a permanent magnet. Alternatively, it can also be powered up only when in proximity to a sketch pad or tool button, such as by detecting the magnetic field of magnetically attached pads and buttons.

Another more preferred way of saving power is by the stylus detecting the state of being held by a human hand and entering a standby mode in the absence of a hand. The human hand can be detected in various ways already known, such as optically (it both blocks ambient light and reflects internally-generated blinking light at close range), via body capacitance, pressure, or any combination of these.

At some point the raw video frames produced by the area scan camera have to be converted to motion data. This could be done in the stylus, in a receiving unit connected to or contained in the computer, or by the computer's CPU. It does not matter where this is done except for minor advantages and disadvantages inherent in each choice.

If done in the computer's CPU, the stylus sends the raw (unprocessed) video frames from the area scan camera to the computer for processing. This means the data rate between the pen and the computer will be somewhat high, but it keeps the stylus simple and thin. The transmitter should save power by transmitting video frames in bursts that are as short as possible. This can be done in a wired or wireless manner. This method is preferred where economy is the highest priority. If the stylus is connected by a cable, then the additional power consumption is not an issue either. The stylus can become thinner still by not having a battery.

If done in the stylus, the optical stylus must also include the computational electronics to interpret the markings that encode their two-dimensional location, and transmit the location data to the computer. This adds size, weight, complexity and cost to the stylus. It also likely reduces its battery life. The advantage is that it offloads this task from the computer and makes it possible for the stylus to appear to be a mouse if desired. This also can be done in a wired or wireless manner.

If done in a receiving unit, then it is necessary to provide a receiving unit that plugs into the computer somewhere, such as a USB port or PCMCIA slot. It may also be built into the computer by an OEM. This receiving unit receives raw video from the stylus. It interprets the markings that encode their two-dimensional location and converts them to location data. This third way also can be done in a wired or wireless manner. It has the advantages of keeping the stylus light, simple and thin and also offloading the image processing from the computer. This method is most preferred for high-end applications.

All of these ways of transmitting data from the stylus to the computer do so in real time. The current invention does not require that the stylus store data for later downloading. The lack of storage circuitry is an additional advantage that simplifies the stylus of the current invention as compared to some digital pens in the prior art.

The actual conversion of video frames to motion or movement data can be done in several ways. The first way uses the same techniques used by optical mice and then converts the result to the sketch pad's coordinate plane. The second way detects the motion in the sketch pad's coordinate plane directly. Only one of these ways needs to be done per embodiment of the invention.

The first way processing video frames to is to process them like optical mice obtain movement data, a method that is well known in the art but that produces $\Delta X$ and $\Delta Y$ in the mouse's coordinate plane. In short, it compares successive video frames (a.k.a. images) in an attempt to align them, by making comparisons with all pixels shifted up, down, left, right and various ways diagonally, or not shifted at all. Whichever comparison results in the closest match is reported. This is typically done at a very high rate such as 1500 frames per second. The results of multiple frames may be combined into one report, so that the computer gets its data at a lower rate.

The next step is to determine the angle of the mouse's coordinate plane to the sketch pad's coordinate plane. To do this a frame is analyzed (near the "hot spot") for a known angle (such as a horizontal line 32 or vertical line 33) or an extended angle marker 39 (the choice depending on which the particular stylus-cooperating indicia offers). This line or angle marker will have an angle in the frame, which is in the stylus's coordinate plane. This angle may have more than one interpretation or meaning. For example, a line may have an angle of 30° in a frame, but its meaning or interpretation is either 30° or 210° because it is not known which way is "up". Depending on which type of stylus-cooperating indicia is chosen, any such ambiguity of the meaning of the lines can be resolved. The angle markers 37, if available, are designed to resolve these issues. Alternatively, the interpretation may be resolved by configuration data. When the actual angle is known, this is the angle upon which the conversion is based.

Now the $\Delta X$ and $\Delta Y$ need to be converted from the mouse's coordinate plane to the sketch pad's coordinate plane according to the actual angle that was just determined. This is done by mathematically according to the well known geometric transformation known as rotation. The result of the transformation are a $\Delta X$ and $\Delta Y$ that are truly horizontal and vertical movement in the sketch pad's coordinate plane.

The second way to process video frames detects the motion in the sketch pad's coordinate plane directly. It does this by finding features in the stylus-cooperating indicia that are easy to find in an image, such as long lines or thick lines or whatever else the chosen indicia scheme offers. The use of color to isolate horizontal features from vertical features, and even both of these from angle markers, can simplify finding these features, but color is not the only way so it is not essential.) The position of these features are compared to the "hot spot" (usually the middle of the image) and to position of the features in the previous frame. The difference is measured as a distance along the direction of the feature and along the direction perpendicular to it. The unit used is arbitrary; for example, the units of pixels may be used. The result is the movement that has taken place in $\Delta X$ and $\Delta Y$ that are truly horizontal and vertical movement in the sketch pad's coordinate plane.

The stylus may be provided with hardware or software driver that causes it to be viewed (by the computer) as an ordinary mouse or other pointing device. However, it is preferred that the user be provided with an option that lets the stylus send motion and contact data directly to certain application programs, bypassing any "pointer acceleration" or "precision enhancement" performed by the operating system. These operating system functions are very useful when used with ordinary mice or finger-operated track pads, but they distort drawings somewhat when used with a stylus.

An optional additional feature of the preferred embodiment of the invention is that the invention be provided with a sketch device driver. This is software driver that interprets the location data and converts it to custom messages to be passed through the operating system directly to a compatible application program. These custom messages are like ordinary mouse movement and mouse click messages but they differ in that they are distinguishable from mouse movement. Thus, the use of the stylus of the current invention does not cause the computer's mouse cursor to be affected. Instead, use of the stylus causes a separate drawing cursor to appear. This separate drawing cursor has its own icon that depends on the tool that is active and never looks like the mouse cursor. The compatible application also has the options of defining unique behaviors that differ from the behavior of the mouse cursor, such as drawing on text rather than selecting text. The special drawing cursor disappears when the stylus is put down or taken out of range of the sketch pad and tools.

Additionally, advanced analysis of the images taken by the stylus can also reveal the angle of the stylus to the plane of the sketch pad, the angle of the stylus to horizontal and the rotation of the stylus about its axis. These data, when reported along with horizontal and vertical motion data and contact data, can be useful in sophisticated drawing programs for such things as mimicking the behavior of a paint brush or colored pencil. This is an optional feature of the invention that may be provided in the most high-end embodiments of the invention.

After installation of the stylus on the computer, if there is a choice of many different sketch pads, the installation program may need to configure the computer to work with the particular sketch pad that was chosen by the user. For example, it may ask the user to slowly drag the stylus from the upper left to the lower right corners so as to determine the orientation of the pad and its maximum extents.

If the different sketch pads use different types of markings and the user is instructed to orient them a certain way then this setup step is unnecessary. For example, it may be advantageous to provide different types of markings optimized for different display resolutions such as SVGA, XGA, UXGA. Each of these can be provided in a variety of physical sizes, with markings scaled accordingly. If the user changes resolutions, then the sketch pad can be remapped in software to the new screen resolution. Thus various sketch pad stickers and tool stickers can be provided with an optical stylus as a kit for retrofitting existing notebook computers that were manufactured without a sketchpad and stylus.

While the current invention has been illustrated by description of several embodiments thereof, the scope of the invention is to be determined by the appended claims, in light of the specification.

I claim:

1. A computer sketch pad and stylus for use with an existing notebook computer, comprising:
   a. at least one sketch pad, each said sketch pad having a top surface and a bottom surface;
   b. stylus-cooperating indicia on the top surface of said at least one sketch pad;
   c. attachement means for attaching said stylus-cooperating indicia to said existing notebook computer such that said stylus-cooperating indicia is visible at least when said existing notebook computer is in use;
   d. an optical stylus comprising at least one camera oriented for optically detecting said stylus-cooperating indicia, and said optical stylus additionally comprising transmitting means for transmitting data derived from its optical detections to said existing notebook computer;
   wherein said attachment means comprises an adhesive affixed to said bottom surface of said sketch pad and said sketch pad is provided with a separable membrane protecting said adhesive.

2. The computer sketch pad and stylus of claim 1 wherein said adhesive on said bottom surface of sketch pad is protected by a peelable cover and said peelable cover is marked with potential cut points where the sketch pad may be cut to adapt it to a particular existing notebook computer prior to its being attached.

3. The computer sketch pad and stylus of claim 1 wherein said sketch pad is marked with potential cut points that are positioned such that the aspect ratio of the post-cut sketch pad can be made to match the aspect ratio of a variety of display screens of common existing notebook computers.

4. A computer sketch pad and stylus for use with an existing notebook computer, comprising:
   (1) at least one sketch pad, each said sketch pad having a top surface and a bottom surface;
   (2) stylus-cooperating indicia on the top surface of said at least one sketch pad;
   (3) attachement means for attaching said stylus-cooperating indicia to said existing notebook computer such that said stylus-cooperating indicia is visible at least when said existing notebook computer is in use;
   (4) an optical stylus comprising at least one camera oriented for optically detecting said stylus-cooperating indicia, and said optical stylus additionally comprising transmitting means for transmitting data derived from its optical detections to said existing notebook computer, wherein:
   a. said optical stylus additionally comprises processor means for interpreting successive camera images to derive movement data;
   b. said optical stylus additionally comprises at least one contact detector on at least one end of said stylus that corresponds to the oriented view of at least one camera;
   c. said transmitting means transmits to said existing notebook computer the derived movement data and at least the contact and no contact status of said contact detector;
   d. said attachment means comprises an adhesive on said bottom surface of said sketch pad;
   e. said stylus-cooperating indicia includes indicia for distinguishing horizontal motion from vertical motion and also establishes at least one fixed angle;
   f. whereby said fixed angle disambiguates motion up from motion down and motion left from motion right, regardless of the orientation of the stylus to the sketch pad and regardless of any rotation about the stylus's own longitudinal axis.

5. A method of upgrading an existing computer with a stylus-type of input device, comprising the steps of:
   (1) applying stylus-cooperating indicia to a surface of said existing computer, said stylus-cooperating indicia including at least a sketch pad, positioned so that said sketch pad is accessible to a stylus when said computer is in use;
   (2) providing an optical stylus comprising at least one camera oriented for optically detecting said stylus-cooperating indicia;
   (3) establishing a communication channel for transmitting data derived from said stylus's optical detections to said existing computer;
   wherein said stylus-type input device provides relative-position, absolute-orientation movement data to said existing computer and
   further wherein said existing computer is an existing notebook computer having a flat surface in front of its keyboard, and said stylus-cooperating indicia is applied to at least part of said flat surface, and said step of applying stylus-cooperating indicia is selected from the group consisting of:
   a. peeling a protective cover off of an sketch pad adhesive sticker and affixing said sketch pad adhesive sticker to said flat surface;
   b. applying a sketch pad transfer decal that transfers pigment to said flat surface;
   c. affixing a sketch pad member to said flat surface by applying a separate adhesive;
   d. affixing a sketch pad member with a fastener;
   e. affixing a sketch pad member magnetically;
   f. direct printing onto said flat surface; and
   g. chemical etching a sketch pad onto said flat surface.

* * * * *